June 14, 1938.    J. L. HILLIS    2,120,360
TYPEWRITING MACHINE
Filed Dec. 5, 1935

INVENTOR
James L. Hillis
BY
W. M. Wilson
ATTORNEY

Patented June 14, 1938

2,120,360

UNITED STATES PATENT OFFICE 2,120,360

TYPEWRITING MACHINE

James L. Hillis, Rochester, N. Y., assignor to International Business Machines Corporation, New York, N. Y., a corporation of New York Application December 5, 1935, Serial No. 52,963

1 Claim. (Cl. 197—123)

This invention relates to improvements in the variable line-spacing clutches commonly used in connection with the platens for typewriters, adding machines, accounting machines, and other office machines.

The principal object of the invention is to provide a variable spacing clutch which is extremely simple yet positive and reliable in its action.

Another object is to provide a variable spacing clutch which is cheaper to manufacture and assemble and requires less servicing than prior clutches of this type.

A further object is to provide a variable spacing clutch which has few tapped or threaded parts and no rivets whereby the clutch may be very quickly assembled, or disassembled for cleaning, repair, and lubrication.

Another object is to provide a variable spacing clutch which is a self-contained unit and does not require an especially bored platen core, a tapped or threaded platen core, or a straight through platen shaft.

An object is to provide a variable spacing clutch which can be used with a platen which consists of a metallic tube supporting a shell of rubber or other suitable material.

Various other objects, advantages, and features of the present invention will be specifically pointed out in the following description and claim, or will be apparent from a study of the specification, claim and drawing.

In the drawing:

Fig. 1 is an irregular section formed by two planes intersecting in the longitudinal axis of the platen and located by the lines 1—1 in Fig. 2, in order to show as much of the clutch as possible in one view.

Figure 1:
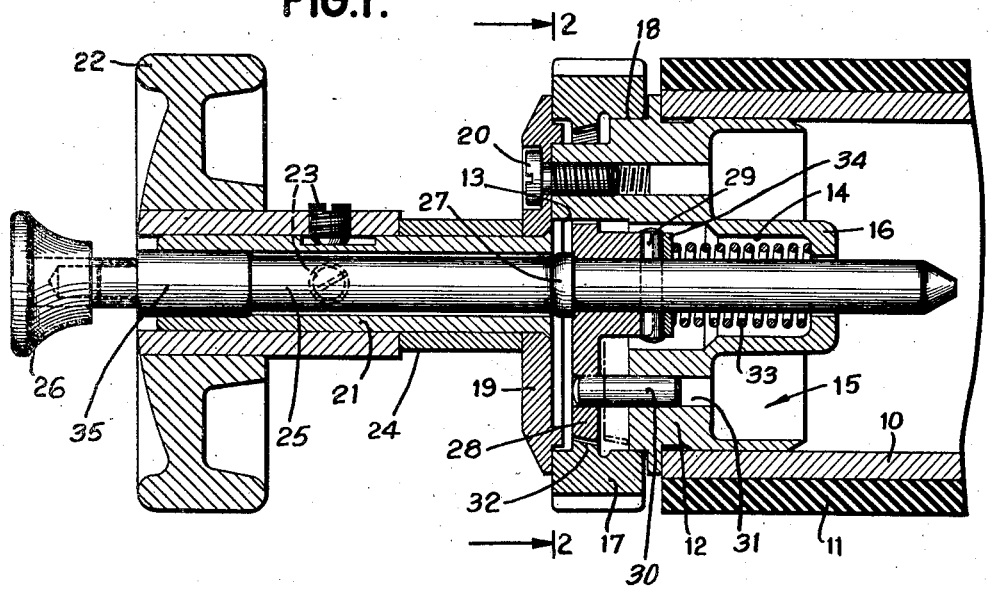
Fig. 1 is a longitudinal section of one end of a platen with the improved clutch attached.

The platen core may comprise a metallic tube 10 supporting a striking surface or shell 11 which may consist of a tube of rubber or other suitable resilient material in accordance with the usual practice in the art. Forced into one end of the tube 10 is a platen supporting hub 12 which may be made of a die-casting of some light alloy such as "duralumin" and similar light alloys, or the hub may be turned from bar stock, as desired.

The hub 12 has a rectangular slot 13 formed transversely of the axis of rotation of the platen, a central bore 14, and an annular recess 15; the bore 14 and recess 15 being concentric with the longitudinal axis of the platen. The recess 15 serves merely to give lightness to the hub 12, while the central, thin-walled elongated housing 16 formed by bore 14 and recess 15 partly supports and guides the clutch operating elements.

The usual line spacing ratchet 17 is rotatably mounted on a shoulder 18 formed in the hub 12. The line space ratchet 17 in some cases may be replaced by a gear driven by some suitable platen rotating device such as is commonly provided in bill-feeding attachments of various kinds. A disc 19 is secured to hub 12 by four screws 20 threaded into holes in the hub 12 adjacent the slot 13, the ratchet 17 turning freely on shoulder 18 between the disc 19 and the radial wall of the shoulder.

Secured to disc 19 is a tube 21 which, with disc 19, acts as a trunnion to rotatably support the hub 12. The usual platen rotating knob 22 is attached to tube 21 by means of two set screws 23 which engage flats milled in the tube 21. A short sleeve 24 is loosely mounted on the tube 21 between the disc 19 and the knob 22 and serves as a bearing for the platen. In the "electromatic" typewriter, the sleeve 24 rests on a yoke secured to the left-hand carriage side plate and is held in place on said yoke by means of a spring catch.

Figure 2:
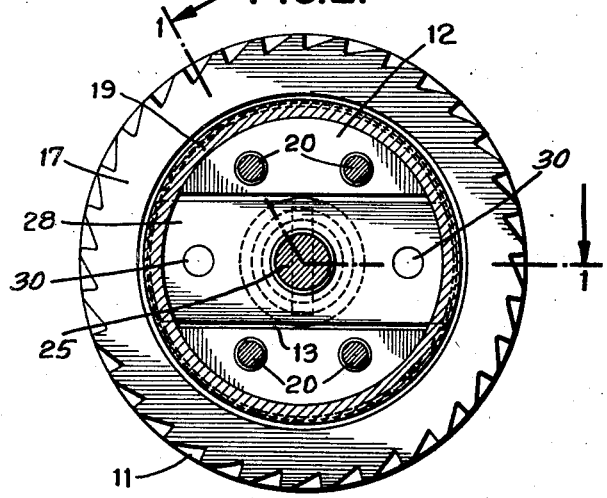
Fig. 2 is a section in the plane designated by the line 2—2 in Fig. 1.

Slidably mounted within the tube 21 and in a concentrically located hole in housing 16, is a push rod 25 having a finger button 26 secured to its left-hand end. Preferably the knob 22 and finger button 26 are molded on metallic hubs and made of some composition such as hard rubber, phenolic condensation product, and similar materials. Near its mid-point the push rod 25 has a shoulder 27 abutting a clutch element 28. The hub of the clutch element 28 has a diametrically cut slot engaged by a pin 29 loosely received in a transverse hole in push rod 25. The clutch element 28 is oblong in general shape as viewed in Fig. 2 and fits loosely in the slot 13 in hub 12. A pair of guide pins 30, pressed into holes 31 located in hub 12 on opposite sides of the push rod 25, loosely engage holes in the clutch element 28 and permit said element to slide freely axially of hub 12 without, however, friction between the straight edges of said element and the walls of slot 13.

The ratchet 17 has an internal flange or rib 32 which is conically surfaced opposite push rod 25 and knurled with fine teeth. The rounded ends of clutch element 28 are conically surfaced and similarly knurled so as to be engageable with the flange 32 for driving purposes. A spring 33, interposed between a washer 34 abutting pin 29 and the housing 16, normally presses push rod 25 and clutch element 28 to the left (Fig. 1) to hold the knurled surfaces in ratchet 17 and said clutch element in firm contact, thus positively coupling the platen to ratchet 17. When the finger button 26 is pushed inwardly, that is, toward knob 22, the push rod 25 is forced to the right (Fig. 1) moving the clutch element 28 out of engagement with the ratchet 17 as shown in broken lines in Fig. 1. The knob 22 may now be turned, while holding button 26 in its inward position, to rotate the platen independently of the ratchet 17.

It will be noted that, with the possible exception of the hub 12 and the molded part of button 26, all the parts of the clutch are turned parts which can be made from bar stock on screw machines requiring very few finishing operations such as tapping, milling, and reaming. Thus, the parts themselves are very cheap to manufacture. The clutch may be very quickly assembled and disassembled since only four screws 20, or even less if desired, are required to hold it securely in assembled relation. The inner end of the push rod 25 is conical to facilitate the assembly operation to avoid the necessity for "fishing" for the hole in housing 16 when inserting the push rod.

Since pin 29 is loose in the hole in push rod 25 and its slot in hub 12, an expensive pinning operation entailing drilling the hub of clutch element 28 and push rod 25 is eliminated. In spite of the fact that pin 29 is loose, it cannot come out after the screws 20 have been turned upright as the central bore 14 is too small to permit the pin moving any appreciable amount laterally of the push rod 25.

In spite of the fineness of the knurled teeth in clutch element 28 and ratchet 17, the clutch is positive and at the same time a very fine degree of adjustment of the platen relative to ratchet 17 is possible. There is no tendency for the platen to slip as is common in clutches depending solely upon surface friction and one or more heavy springs to produce the gripping pressure.

While the clutch is composed of sturdy parts of ample size and strength, it is very compact and does not increase the length of the platen or reduce its capacity as to length of line. Since almost the entire clutch is housed in the hub 12, an expensive, especially bored platen core is unnecessary and a simple metal tube is all that is required for a core. A straight-through platen shaft is not necessary and in its stead a short length of shaft pressed into a suitable hub which in turn is pressed into the platen core may be used to support the platen core at the end opposite the clutch. The cost of the platen, viewed as an assembled unit for placement in the carriage, is thus very much reduced.

It will be noted in Fig. 1 that the push rod 25 is considerably smaller in diameter than the bore of the tube 21 and the hole in housing 16 except near the left-hand end of tube 21 where at 35 the push rod is enlarged to loosely fit the bore of the tube. Thus, the push rod has virtually a universal mounting at its outer end so that the inner end can float slightly whereby the knurled surfaces of clutch element 17 and 28 are virtually self-aligning. This ensures firm seating of the clutch elements and a positive engagement between them. This construction also avoids the necessity for accurately fitting many of the parts and permits a cheaper cost of production due to the wider tolerances permitted in many of the dimensions.

While there has been shown and described and pointed out the fundamental novel features of the invention as applied to a single embodiment, it will be understood that various omissions and substitutions and changes in the form and details of the device illustrated and in its operation may be made by those skilled in the art without departing from the spirit of the invention. It is the intention therefore to be limited only as indicated by the scope of the following claim.

What is claimed is as follows:

A line spacing clutch comprising a rotatable support, a platen rotating member freely rotatable on said support and having a knurled clutch surface, a clutch member slidably mounted on said support and having a knurled clutch surface engaging the clutch surface in the platen rotating member; a push rod coaxial with said support and engaging the clutch member, said push rod being loosely mounted in a bore in said support and passing through the clutch member whereby the push rod and clutch member float slightly relative to said support to permit even seating of the knurled surfaces; and a spring housed in said bore and holding said surfaces in engagement.

JAMES L. HILLIS.